United States Patent [19]
Konishi et al.

[11] Patent Number: 6,092,755
[45] Date of Patent: Jul. 25, 2000

[54] REEL STAND INTEGRATING BRAKE TORQUE MECHANISM

[75] Inventors: Akio Konishi, Hyogo; Koichiro Hirabayashi; Shigeo Ueda, both of Osaka; Tatsuo Terao, Ehime, all of Japan

[73] Assignee: Matsushita Electric Industrial Co., Ltd., Osaka, Japan

[21] Appl. No.: 09/271,648

[22] Filed: Mar. 18, 1999

[30] Foreign Application Priority Data

Mar. 19, 1998 [JP] Japan .................................. 10-070173

[51] Int. Cl.⁷ ........................................................ G03B 1/04
[52] U.S. Cl. .................................... 242/355.1; 242/422.4; 242/422.9; 360/96.3
[58] Field of Search .............................. 242/355.1, 422.4, 242/422.9; 360/96.3, 96.4, 83, 90

[56] References Cited

U.S. PATENT DOCUMENTS

| | | | |
|---|---|---|---|
| 3,667,762 | 6/1972 | Scheid | 360/90 |
| 3,900,174 | 8/1975 | Morimoto et al. | 242/355.1 X |
| 4,383,282 | 5/1983 | Osanai | 360/96.3 |
| 4,630,149 | 12/1986 | Ida | 360/96.4 |
| 4,649,306 | 3/1987 | Yamashita | 360/90 X |
| 5,308,016 | 5/1994 | Saito et al. | 360/96.3 X |
| 5,481,418 | 1/1996 | Maikuma et al. | 360/96.3 X |
| 5,884,858 | 3/1999 | Woo | 360/96.4 X |
| 5,903,412 | 5/1999 | Ide et al. | 360/96.3 |

*Primary Examiner*—Donald P. Walsh
*Assistant Examiner*—Minh-Chau Pham
*Attorney, Agent, or Firm*—Ratner & Prestia

[57] ABSTRACT

A reel stand includes (a) a reel base for engaging a reel and driving the reel, (b) a bearing disposed in the reel base and being extended through by a rotary shaft, and (c) a spring being urged to the rotary shaft. This construction allows the reel stand to integrate a brake torque mechanism into its downsized body, and to provide a tape with uniform tape tension when the tape is taken up or supplied. The spring is pressed to the shaft to produce brake torque, which lowers the peripheral velocity of the shaft. As a result, less frictional heat is produced, which reduces changes in friction factors due to the heat.

8 Claims, 4 Drawing Sheets

REEL STAND INTEGRATING BRAKE TORQUE MECHANISM

FIELD OF THE INVENTION

The present invention relates to a reel stand installed in a magnetic recording apparatus (e.g. a video cassette recorder, VCR). More particularly, the present invention relates to a reel stand that can provide a tape with uniform tension when the tape is supplied or taken up.

BACKGROUND OF THE INVENTION

Recently, VCRs have been made smaller and smaller, and camcorders, in particular, have been remarkably downsized. This market tendency and the recent advanced technique require a fine control over tape tension when the tape is supplied or taken up.

The construction and operation of a conventional reel stand mounted to this kind of apparatuses is described with reference to FIGS. 5 and 6.

The conventional reel stand, in general, has a contact member comprising a brake-pad made of resin or felt. The brake-pad urges an outer rim of the reel stand to apply some load thereto in order to provide tape tension.

FIG. 5 is a plan view of the conventional reel stand. FIG. 6 is a cross section of the reel stand shown in FIG. 5.

In FIG. 6, reel-stand-supporting-shaft 513 is fixedly secured to chassis 516. The reel stand comprises reel base 503, spring 504, reel stopper 505, brake contact section 506, yoke plate 507, magnet 508, washer 509, clutch gear 510, panel 511, reel cap 512, direct-coupled gear 514 and rotation-sensing-target 515. The reel stand is journaled by shaft 513. Rotating force of an outer gear (not shown) travels through clutch gear 510 or direct-coupled gear 514 to drive the reel stand. Then, reel "1a" within a cassette case "1b" mounted on the reel stand is spun via reel stopper 505.

Reel base 503 is journaled by shaft 513 and receives reel "1a" thereon. Reel stopper 505 allows reel "1a" to arbitrarily move in axial direction but engages reel "1a" in the rotational direction. Compression spring 504 always urges reel stopper 505 upward from reel base 503. Reel cap 512 is screwed (the screw is not shown) on reel base 503 and prevents stopper 505 from coming off. Reel cap 512 contacts a tip of shaft 513 so that the entire reel stand is supported by the shaft in the thrust direction. Reel base 503, yoke plate 507 and brake contact section 506 are integrally assembled. Brake contact section 506 made of resin contacts brake pad 501 mounted to brake 502 disposed outside the stand, thereby applying some load to the rotation of the reel stand. Magnet 508 attracts yoke plate 507 with its own magnetic force, and rotates with yoke plate 507.

Clutch gear 510 is integrally assembled with panel 511 made of hysteretic material, and contacts reel base 503 via washer 509. Clutch gear 510 is coaxial with reel base 503 and can rotate arbitrarily. Panel 511 is attracted by magnet 508 due to the rotation of gear 510, and transfers the rotation to reel base 503. The clutch mechanism is thus structured.

Direct-coupled gear 514 is press-fitted into reel base 503 and integrated therein. Rotation-sensing-target 515 is disposed on the bottom face of the reel stand to face a rotation detector (not shown) mounted to chassis 516. This set of detector and target 515 can detect the rotation of the reel stand.

Another shaft 517 is fixedly mounted on chassis 516. In FIG. 6, brake 502 is mounted to shaft 517 and hits break contact section 506 by spring action. Brake pad 501, shaped as a plate and made of resin, is stuck to brake 502, and is urged to brake contact section 506 by twisted spring 518.

A braking operation of the conventional reel stand discussed above is described hereinafter.

The rotating force of an outer driving gear (not shown) travels through clutch gear 510 or direct-coupled gear 514 to rotate the reel stand. In this case, if little hold-back load were applied, reel "1a" situated on the reel stand would be rotated and tape wound on reel "1a" would be loosened. In order to overcome this problem, light hold-back load must be applied with the reel stand by contacting brake pad 501 to brake contact section 506 of the reel stand. This braking operation always functions as hold-back torque to the reel stand both in recording mode and play-back mode.

As such, the conventional reel stand requires a space outside thereof for accommodating the brake mechanism including brake 502, brake pad 501, shaft 517 and spring 518. This space requirement has restricted the apparatus from being further downsized. Further, the outer rim of the reel stand contacts the brake, and the peripheral velocity of brake contact section 506 is so high, which generates a great amount of frictional heat between section 506 and pad 501, and both are worn out in a short period of time due to the friction.

SUMMARY OF THE INVENTION

The present invention aims to address the problems discussed above and to provide a compact reel stand that can provide stable tape tension.

The reel stand of the present invention comprises the following elements:

(a) a reel base for engaging a reel and driving the reel;

(b) a bearing disposed in the reel base and through a rotary shaft; extends and (c) a contact member rotating integrally with the real stand, and urged against the rotary shaft;

This construction allows this compact reel stand to integrate a brake torque mechanism therein, and to provide stable tape-tension to the tape when it is supplied or taken up. Brake torque is applied by urging the contact member against the shaft so that the peripheral velocity of the brake contact section is lower than that of the conventional one. As a result, less frictional heat than the prior art can decrease changes in friction factors.

DETAILED DESCRIPTION OF THE INVENTION

An exemplary embodiment of the present invention is described hereinafter with reference to the accompanying drawings.

Figure 1:
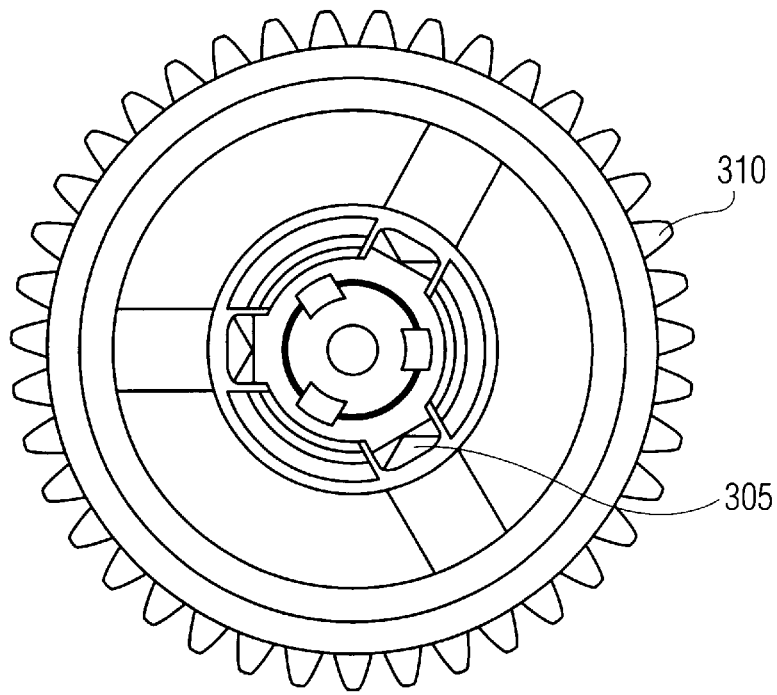
FIG. 1 is a plan view of a reel stand in accordance with an exemplary embodiment of the present invention.
Figure 2:
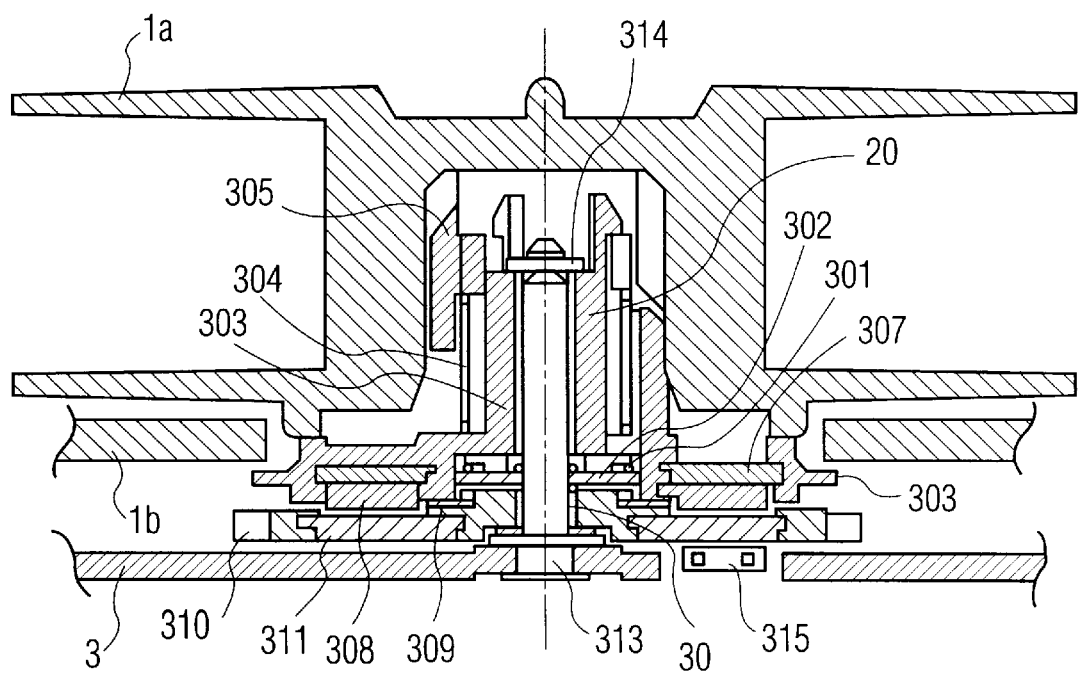
FIG. 2 is a cross section of the reel stand in accordance with the exemplary embodiment of the present invention.
Figure 3:
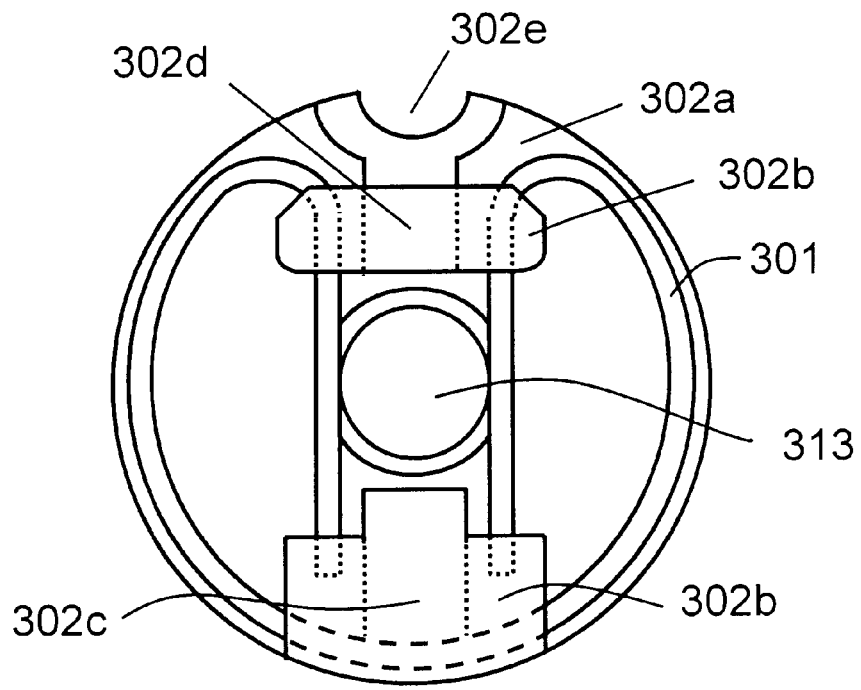
FIG. 3 is a plan view of a spring and a holder thereof in accordance with the exemplary embodiment of the present invention.
Figure 4:
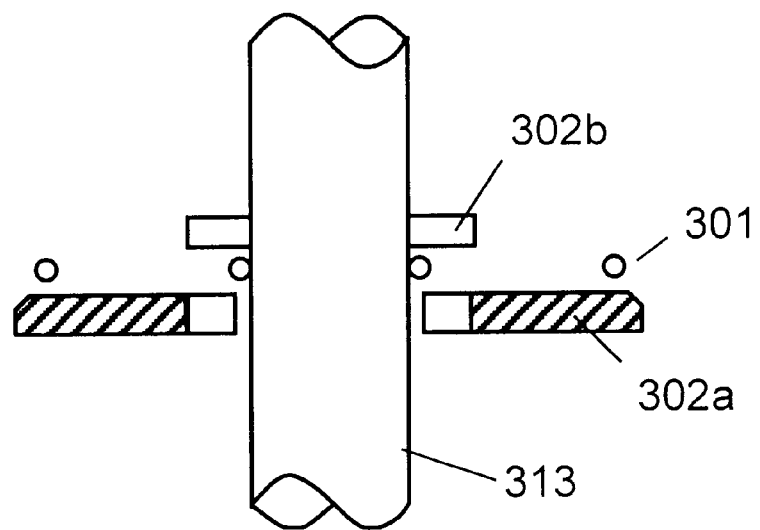
FIG. 4 is a cross section of the spring and the holder thereof in accordance with the exemplary embodiment of the present invention.
Figure 5:
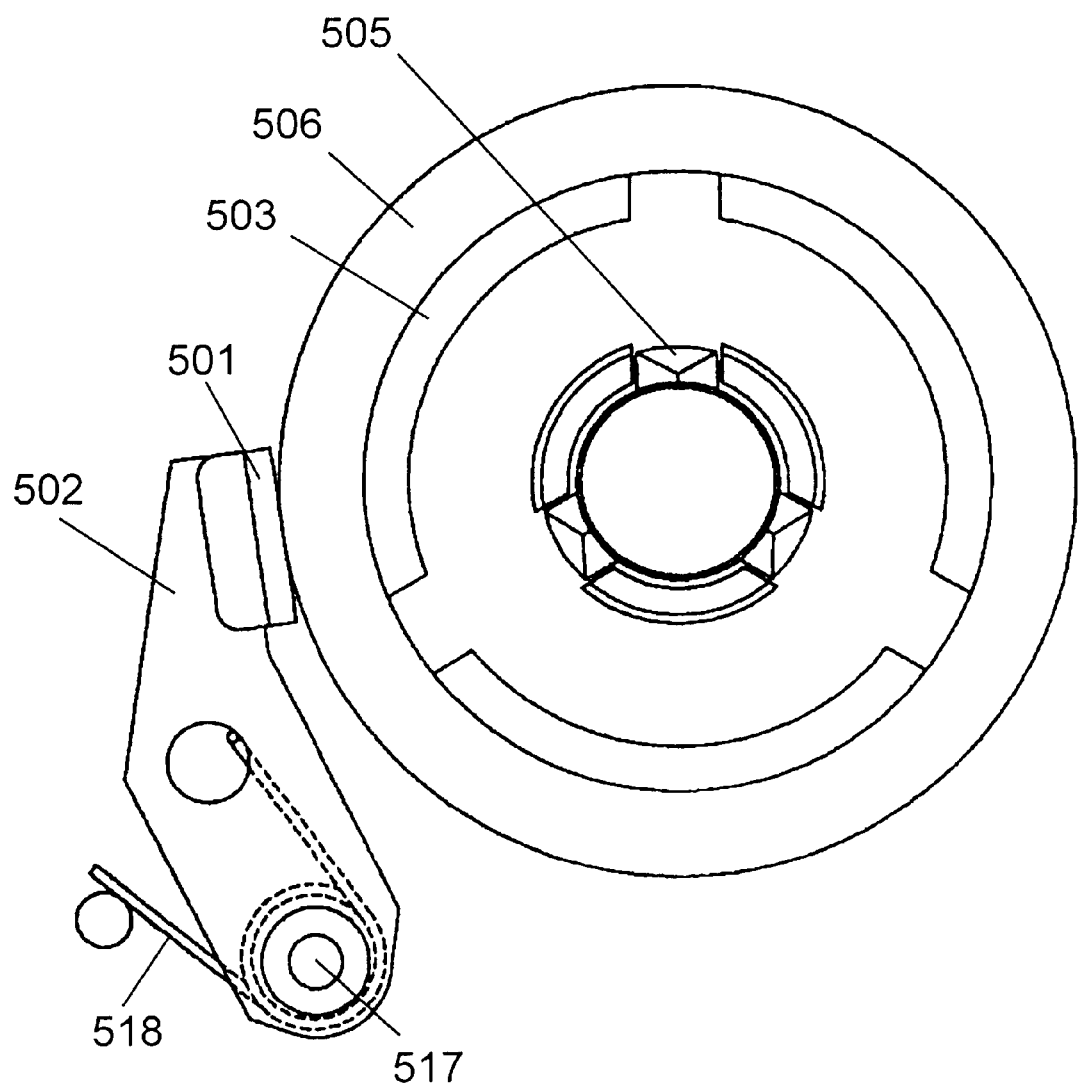
FIG. 5 is a plan view of a conventional reel stand and brake section.
Figure 6:
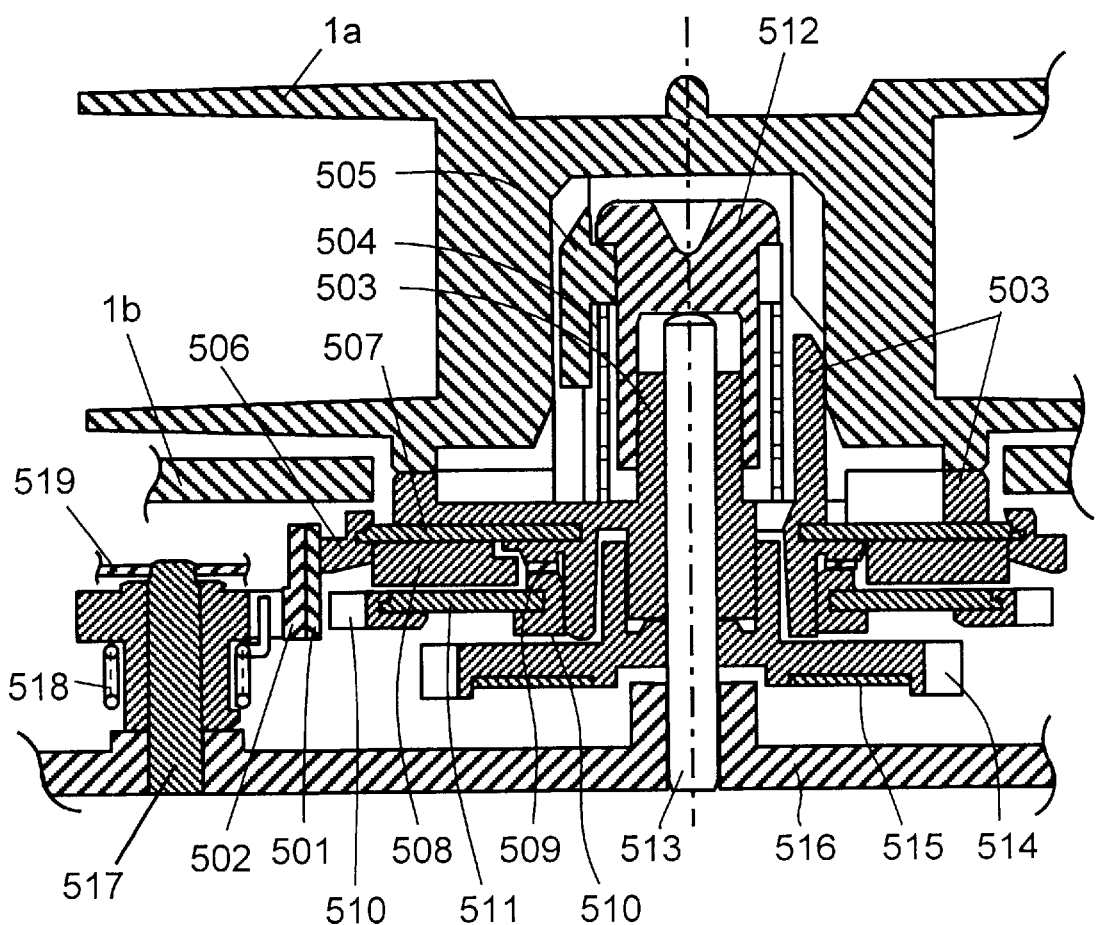
FIG. 6 is a cross section of the conventional reel stand and brake section.

FIG. 1 is a plan view of a reel stand in accordance with an exemplary embodiment of the present invention, and FIG. 2 is a cross section of the reel stand shown in FIG. 1. FIG. 3 is a plan view of a spring and holder thereof used in the exemplary embodiment, and FIG. 4 is a cross section of the spring and the holder shown in FIG. 3.

In FIG. 1 and FIG. 2, reel-stand-supporting-shaft 313 is fixedly secured on chassis 3. A reel stand includes an upper stand section, a lower stand section and a brake torque mechanism disposed in between. The upper stand section comprises reel base 303, bearing 20, reel stopper 305, spring 304, yoke plate 307 and magnet 308. The lower stand section includes a power transmission section, e.g. clutch gear 310, and bearing 30 as well as panel 311 made of hysteretic material. The brake torque mechanism has spring 301 functioning as a contact member with shaft 313, and holder 302 thereof. Spring 301 made of metal forms a given shape. The reel stand is journaled by shaft 313 extending through the bearing 20 of the upper stand section and bearing 30 of the lower stand section. Gear 310 rotates reel stand by conveying the rotating force of an outer gear (not shown). Reel "1a" in cassette case "1b" situated on the reel stand is thus spun via reel stopper 305.

Reel base 303 with reel "1a" thereon is journaled by shaft 313. Reel stopper 305 allows reel "1a" arbitrarily to move in axial direction but engages reel "1a" in the rotational direction. Compression spring 304 always urges stopper 305 upward from reel base 303. A claw of reel base 303 regulates stopper 305 from moving upward.

Yoke plate 307 is integrated with reel base 303. Magnet 308 attracts yoke plate 307 due to its own magnetic force, and rotates together with plate 307.

Clutch gear 310 is integrated with panel 311 made of hysteretic material and contacts reel base 303 via washer 309. Clutch gear 310 is coaxial with reel base 303 and arbitrarily rotates. Panel 311 is attracted to magnet 308 due to the rotation of gear 310. The rotation of gear 310 is conveyed to reel base 303. A clutch mechanism is thus constructed as discussed above. Rotation detector 315 converts the changes in magnetic force of magnet 308 into electric signals in order to detect a rotation of the reel stand. Washer 314 regulates the play of reel stand in the thrust direction.

In FIG. 3 and FIG. 4, an elastic body, e.g. a spring 301 made of metal and forming a given shape, is pressed to an outer wall of shaft 313 as a contact member, and holder 302 sandwiches spring 301 with its upper section 302b and lower section 302a. Holder 302 retains spring 301 as discussed above and rotates integrally with reel base 303, but has some axial space between spring 301 for allowing slight play.

An operation of the reel stand is described hereinafter.

Clutch gear 310 is driven by an outer driving gear (not shown), then magnetic attracting force is produced between magnet 308 and panel 311 so that clutch gear 310 supports thrust load of the reel stand via washer 309. The magnetic attracting force conveys rotating force of clutch gear 310 to reel base 303. Together with clutch gear 310, reel base 303 is journaled by shaft 313 extending through bearing 20 of base 303 and bearing 30 of gear 310. Magnet 308, yoke plate 307 and reel stopper 305 also spin at the same time. The spin of reel stopper 305 allows reel "1a" to spin, then the tape is supplied or taken up.

Spring 301 is formed as shown in FIG. 3, and its rim section has been formed so that the diameter thereof is smaller than the diameter of shaft 313. Shaft 313 is inserted into a widened rim section of spring 301 so that spring 301 can pinch shaft 313 with its normal pressure. The reel stand in this embodiment makes use of this frictional force on the contact section between spring 301 and shaft 313 as brake torque. The peripheral velocity of the contact section is lower than the conventional case by urging spring 301 against shaft 313. As a result, less frictional heat is produced. Since spring 301 is made of metal, an excellent heat conductivity can reduce changes in friction factors due to heat generation. Further, stable-contact-pressure can be obtained because spring pressure is utilized, which can provide the reel stand with uniform brake torque.

As shown in FIG. 4, spring 301 is disposed between holder-lower-section 302a and holder-upper-section 302b with given spaces in between respectively. Spring 301 is thus held within a restricted axial location. Parts of holder 302c and 302d form walls between upper section 302b and lower section 302a. Spring 301 is held by holder 302 maintaining a narrow space with regard to the walls. The location of spring 301 is thus restricted also in the rotational direction with a given space. Holder 302 has a sufficient space with regard to shaft 313 and is free from contact with shaft 313.

The structure discussed above allows spring 301 to have spaces between spring 301 and holder 302 in both thrust and rotational directions. Spring 301 is thus urged to shaft 313 without receiving forces from holder 302. Only frictional force is produced between spring 301 and shaft 313. Further, as shown in FIG. 3, notch 302e is provided on holder 302, and the notch is engaged with a protrusion (not shown) formed on reel base 303, so that reel base 303 integrally rotates with holder 302. As such, the reel stand rotates in such a manner that spring 301, being urged to shaft 313, spins via holder 302 that also integrally rotates with reel base 303. The frictional force produced at the contact section in the rotational direction functions as brake torque, namely, the reel stand rotates receiving the brake torque.

According to the exemplary embodiment discussed above, the reel stand of the present invention comprises the following elements.

(a) a reel stand upper section including:
  (a-1) a reel stopper for engaging a reel;
  (a-2) a reel base on which the reel stopper is mounted; and
  (a-3) a first bearing disposed in the reel base;
(b) a reel stand lower section including:
  (b-1) a gear section receiving rotating force from outside; and
  (b-2) a second bearing disposed in the gear section;
(c) a coupler for coupling the reel upper section with the reel lower section using magnetic force;
(d) a shaft extending through the first and second bearings, and journaling the reel upper section and lower section; and
(e) a contact member disposed between the reel upper section and lower section, and being urged to the outer wall of the shaft.

The contact member provides the shaft with brake torque, and the coupler conveys rotating force of the gear section to the reel upper section, then the reel is spun by the rotating force conveyed via the reel stopper.

This construction allows the brake torque mechanism to be integrated within the reel stand, thereby downsizing the reel stand per se. Further the spring and its holder can be also integrated into a unit, which facilitates assembly of the reel stand. This construction also produces a stable contact pressure between the spring and the shaft. Since a metallic spring is used, excellent heat conductivity is obtained, which can reduce changes in friction factors. As a result, constant tension is provided to the tape.

In this exemplary embodiment, the rotating clutch mechanism is clutched by magnetic force; however, the mechanism can employ felt as a contact member. Further, the elastic holder rotates integrally with the reel stand upper section; however, the elastic holder can rotates integrally with the reel stand lower section.

What is claimed is:

1. A reel stand engaging with a reel on which a magnetic tape is wound and driving said reel, said reel stand comprising:
   (a) a reel stopper for engaging a reel;
   (b) a bearing through which a rotary shaft of said reel stand extends; and
   (c) a contact member rotating integrally with said reel stand, and urged against an outer wall of the rotary shaft.

2. The reel stand as defined in claim 1 wherein said contact member comprises an elastic body.

3. The reel stand as defined in claim 2 further comprising a holder for holding the elastic body, wherein said holder rotates integrally with said reel stand.

4. The reel stand as defined in claim 1 wherein said contact member comprises a spring.

5. A reel stand comprising:
   (a) a reel stand upper section including:
      (a-1) a reel stopper for engaging a reel;
      (a-2) a bearing being extended through by a rotary shaft; and
   (b) a reel stand lower section including:
      (b-1) a power transmission section for receiving rotating force from outside; and
      (b-2) a rotation center concentric with a rotation center of said reel stand upper section;
   (c) a coupler for coupling the reel upper section with the reel lower section using a clutch mechanism; and
   (d) a contact member disposed between said reel stand upper section and said reel stand lower section, and being urged to an outer wall of the rotary shaft.

6. The reel stand as defined in claim 5 wherein said contact member comprises an elastic body.

7. The reel stand as defined in claim 6 further comprising an elastic holder for holding the elastic body, wherein said holder rotates integrally with one of said reel stand upper section and said reel stand lower section.

8. The reel stand as defined in claim 5 wherein said contact member comprises a spring.

* * * * *